W. H. Goodale,
Gate.
No. 92,524.  Patented July 13, 1869.
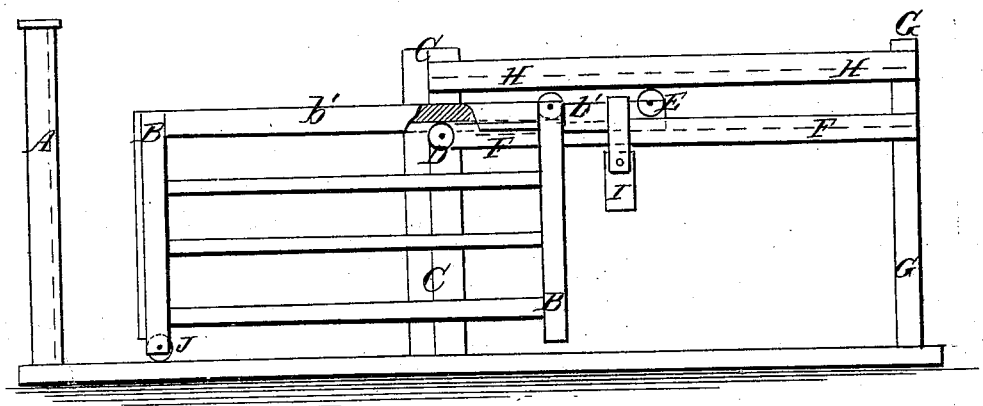
Witnesses:
Hinchman
Geo. W. Mabee
Inventor:
W. H. Goodale
Per Munn & Co
Attorneys.

United States Patent Office.

WILLIAM H. GOODALE, OF COLTON, NEW YORK.

Letters Patent No. 92,524, dated July 13, 1869.

IMPROVEMENT IN GATES.

The Schedule referred to in these Letters Patent and making part of the same.

*To all whom it may concern:*

Be it known that I, WILLIAM H. GOODALE, of Colton, in the county of St. Lawrence, and State of New York, have invented a new and useful Improvement in Gates; and I do hereby declare that the following is a full, clear, and exact description thereof, which will enable others skilled in the art to make and use the same, reference being had to the accompanying drawing, forming part of this specification.

The figure is a side view of my improved gate partly opened, parts being broken away to show the construction.

Similar letters of reference indicate corresponding parts.

My invention has for its object to furnish an improved gate, simple in construction, strong, durable, and easily and conveniently operated; and It consists in the construction and combination of various parts of the gate, as hereinafter more fully described.

A is the front gate-post, the forward side of which is grooved longitudinally, to receive a rib or tongue formed upon the forward side of the front vertical bar of the gate B, to support the gate when closed against side pressure.

C is the rear gate-post, along the side of which the gate B slides.

If desired, another rear post may be set upon the opposite side of the gate from the post C, to further support the rear end of the said gate against side pressure.

D is a pulley, pivoted to the upper part of the post C, in such a position that its upper side may enter a longitudinal groove in the under side of the bar of the gate B, to support said gate as it moves open and shut.

The rear end of the top bar $b'$ of the gate projects in the rear of said gate, and has a pulley, E, pivoted to its rear end, which pulley E rolls along the upper edge of the bar F, attached to the posts C and G in such a position that its upper edge may enter the longitudinal groove in the under side of the top bar $b'$ of the gate B, so as not only to support the rear end of the gate while being opened and closed, but so as also to sustain the rear end of the gate against side pressure.

H is a bar, attached to the posts C and G directly above and parallel with the bar F, and in such a position that the upper side of the roller E may bear against it, to balance the weight of the forward part of the gate B while said gate is being opened and closed.

The same thing may be accomplished by suspending a weight, I, from the projecting rear end of the bar $b'$, as shown in the figure.

If desired, the projecting part of the bar $b'$ may be cut off or omitted, and the pulley E pivoted to the upper rear corner of the gate B, as shown in red in the drawing.

A pulley, J, may be pivoted to the lower end of the front vertical bar of the gate B, to relieve the friction, should the forward end of the gate come in contact with the ground.

Having thus described my invention,

What I claim as new, and desire to secure by Letters Patent, is—

1. The combination of the bar F with the grooved under side of the top bar $b'$, of the gate B, and with the pulley E, substantially as herein shown and described, and for the purpose set forth.

2. The combination of the bar H with the bar F, pulley E, and projecting end of the bar $b'$, substantially as herein shown and described, and for the purpose set forth.

3. The combination of the weight I with the projecting end of the bar $b'$, with the pulley E, and with the bar F, substantially as herein shown and described, and for the purpose set forth.

4. The arrangement of the pulley D with the bar F, post C, and top bar $b'$ of the gate, substantially as herein shown and described, and for the purpose set forth.

WM. H. GOODALE.

Witnesses:
H. S. HEPBURN,
C. C. SANBORN.